United States Patent [19]

Fontana et al.

[11] Patent Number: 5,510,182
[45] Date of Patent: Apr. 23, 1996

[54] COPOLYESTERCARBONATE COMPOSITION DERIVED FROM DIHYDRIC PHENOL, CARBONATE PRECURSOR AND AN ALPHA, OMEGA DICARBOXYLIC ACID

[75] Inventors: Luca P. Fontana, Evansville; Kenneth F. Miller, Mt. Vernon, both of Ind.; Adrianus A. Claesen, CA Bergen Op Zoom, Netherlands; Peter W. van Es, GV Hoogerheide, Netherlands; Theodorus O. N. de Vroomen, Dordrecht, Netherlands; Clayton B. Quinn, Burnt Hills, N.Y.; Richard W. Campbell, Evansville, Ind.

[73] Assignee: General Electric Company, Pittsfield, Mass.

[21] Appl. No.: 219,128

[22] Filed: Mar. 29, 1994

Related U.S. Application Data

[62] Division of Ser. No. 44,852, Apr. 8, 1993, Pat. No. 5,321,114, which is a division of Ser. No. 627,517, Dec. 14, 1990, abandoned, which is a continuation-in-part of Ser. No. 476,068, Jan. 30, 1990, abandoned, which is a continuation-in-part of Ser. No. 455,118, Dec. 22, 1989, abandoned.

[51] Int. Cl.$^6$ ..................................... C08G 63/64
[52] U.S. Cl. .................. 428/35.7; 428/364; 428/412; 528/125; 528/171; 528/176; 528/179; 528/185; 528/193; 528/196; 528/480; 528/502
[58] Field of Search ..................... 528/179, 176, 528/480, 502, 125, 171, 185, 193, 196; 428/412, 35.7, 364; 264/176.1; 206/819

[56] References Cited

U.S. PATENT DOCUMENTS

| | | | |
|---|---|---|---|
| 3,030,331 | 4/1962 | Goldberg | 528/182 |
| 3,169,121 | 2/1965 | Goldberg | 528/173 |
| 4,286,083 | 8/1981 | Kochanowski | 528/173 |
| 4,983,706 | 1/1991 | Fontana et al. | 528/176 |
| 5,015,720 | 5/1991 | Boden et al. | 528/179 |
| 5,025,081 | 6/1991 | Fontana et al. | 528/176 |
| 5,321,114 | 6/1994 | Fontana et al. | 528/179 |

Primary Examiner—James J. Seidleck
Assistant Examiner—Terressa M. Mosley

[57] ABSTRACT

A composition comprising a copolyestercarbonate derived from a dihydric phenol, a carbonate precursor, and an aliphatic alpha omega dicarboxylic acid or ester precursor wherein the dicarboxylic acid or ester precursor has from 10 to about 20 carbon atoms, inclusive, and is present in the copolyestercarbonate in quantities of from about 2 to 30 mole percent of the dihydric phenol.

17 Claims, No Drawings

COPOLYESTERCARBONATE COMPOSITION DERIVED FROM DIHYDRIC PHENOL, CARBONATE PRECURSOR AND AN ALPHA, OMEGA DICARBOXYLIC ACID

This is a divisional of application Ser. No. 08/044,852, now U.S. Pat. No. 5,321,114 filed on Apr. 8, 1993, which is a divisional of Ser. No. 07/627,517, filed Dec. 14, 1990, now abandoned, which is a continuation-in-part of Ser. No. 07/476,068 now abandoned filed Jan. 30, 1990, which is a continuation-in-part of U.S. Ser. No. 07/455,118, now abandoned filed Dec. 22, 1989.

BACKGROUND OF THE INVENTION

Polycarbonates are well known as a tough, clear, highly impact resistant thermoplastic resin. However the polycarbonates are also possessed of a relatively high melt viscosity. Therefore in order to prepare a molded article from polycarbonate, relatively high extrusion and molding temperatures are required. Various efforts throughout the years to reduce the melt viscosity while also maintaining the desired physical properties of the polycarbonates have been attempted. These methods include the use of plasticizers, the use of aliphatic chain stoppers, reduction of molecular weight, the preparation of bisphenols having long chain aliphatic substituents and various polycarbonate copolymers as well as blends of polycarbonate with other polymers.

With respect to plasticizers, these are generally used with thermoplastics to achieve higher melt flow. However usually accompanying the plasticizer incorporation into polycarbonate compositions are undesirable features such as embrittlement and fugitive characteristics of the plasticizer.

Increased flow can be fairly readily obtained with the use of aliphatic chain stoppers, however impact resistance as measured by notched izod drops significantly. Embrittlement may also be a problem.

When utilizing a bisphenol having a lengthy aliphatic chain thereon, increases in flow can be observed. However these are usually accompanied by substantial decreases in the desirable property of impact strength.

Reducing the molecular weight of polycarbonate has also been useful to increase flow for applications requiring thin wall sections. However, molecular weight reduction is limited in the extent that it can be practiced before properties such as ductility and impact strength are severely hampered.

Blends of polycarbonate with other polymers are useful to increase melt flow, however the very useful property of transparency is generally lost.

With respect to polycarbonate copolymers it has been well known that a reduced glass transition temperature Tg, can be obtained by introducing aliphatic ester fragments into the polycarbonate backbone. Examples of this work go back as early as the original copolyestercarbonate patent of Goldberg, U.S. Pat. No. 3,169,121 wherein at column 3, line 64 to column 4, line 41 various aliphatic dibasic acids are disclosed as being appropriate for usage in making copolyestercarbonates. Reduced softening points are noted. At column 4, line 11, azelaic and sebacic acids are disclosed. At column 7, example 4, a 50 mole percent ester content bisphenol-A copolyestercarbonate based on bisphenol-A using azelaic acid as the ester linkage is disclosed. Various other patents since that time have broadly disclosed the use of aliphatic acids in the preparation of copolyestercarbonates for example U.S. Pat. Nos. 3,030,331, 4,238,596, 4,238,597, 4,504,634, 4,487,896 and 4,252,922. Kochanowski U.S. Pat. No. 4,286,083, specifically refers to the making of a copolyestercarbonate utilizing bisphenol-A, azelaic acid and phosgene in example 6 at column 9. 25 mole percent of the azelaic acid, based on the moles of bisphenol-A, was contacted with the bisphenol-A together with phenol as a chain stopper, and triethylamine as a catalyst in an interfacial reaction with phosgene wherein the pH was maintained at 6 over a period of 35 minutes and then raised to 11.4 for a period of 36 minutes. Generally these copolyestercarbonates with aliphatic linkages have significantly lowered Tgs than the polycarbonate and therefore are processable at lower temperature. However, these polymers as in Kochanowski do not have other physical properties reported, in particular impact resistance or impact resistance under various environmental conditions such as heat aging and/or reduced temperature.

Chain stoppers have been utilized in making polymers for many decades. The function of the chain stopper in the preparation of the polymer is to control the molecular weight. Generally these chain stopping compounds are monofunctional compounds similar to the functionality of a repeating unit of the polymer. For quite some time scant attention was directed to the structure of the chain stopping agent other than it be reactive with the monomer unit during the preparation of the polymer and be compatible with the polymer. In the last few years more attention has been directed to the structure of the chain stopper. It has been found that the structure of the chain stopping compound can significantly effect the property spectrum of the polymer. For many years, phenol had been the standard chain stopping agent used in the preparation of polycarbonate. At times paratertiarybutylphenol was employed as a chain stopping agent. Lately more attention has been focused on other materials for preparation of the polycarbonate. U.S. Pat. No. 4,269,964, disclosed the usage of isooctyl and isononyl substituted phenols as chain stoppers for polycarbonate. Additionally paracumylphenol and chromanyl compounds have been utilized to chain stop polycarbonates. Both the paracumylphenol and chromanyl compounds have been utilized to chain stop copolyestercarbonates wherein there is a totally aromatic molecule with high ester content, see U.S. Pat. Nos. 4,774,315 and 4,788,275. Accompanying the usage of the larger sized endgroups has been the ability to obtain the same or essentially the same physical characteristics of the polycarbonate but at a lower molecular weight. This lower molecular weight provides better flow than a polycarbonate of a higher molecular weight. However these systems reach a point wherein the chain stopping agent cannot solve the problems caused by utilizing a shorter chain length, i.e., lower molecular weight polycarbonate. Embrittlement occurs, therefore there still exists a need for a polymer having lower processing temperature but which is accompanied by substantially increased flow and essentially the full spectrum of polycarbonate properties.

A new polymer system has now been discovered which manages to combine excellent processability due to its extremely high melt flow with essentially maintained physical properties such as toughness, transparency, and impact resistance.

SUMMARY OF THE INVENTION

In accordance with the invention there is a composition comprising a copolyestercarbonate polymer derived from a dihydric phenol, a carbonate precursor and an aliphatic alpha omega dicarboxylic acid or ester precursor wherein the dicarboxylic acid has from ten to about twenty carbon atoms, inclusive and the dicarboxylic acid is present in the copolyestercarbonate in quantities of from about 2 to 30 mole percent of the dihydric phenol.

A further aspect is the copolyestercarbonate of the invention extended to include dicarboxylic acids of 8 and 9 carbon atoms, which is endcapped with a monophenolic compound which provides the copolyestercarbonate with better Notched Izod impact resistance and ductility after aging than the phenol endcapped copolyestercarbonate.

DETAILED DESCRIPTION OF THE INVENTION

Dihydric phenols which are useful in preparing the copolyestercarbonate of the invention may be represented by the general formula

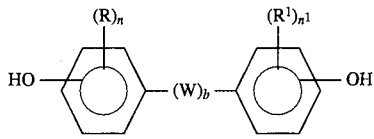

Figure 1 wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon

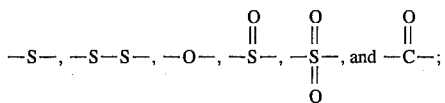

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference.

The carbonate precursor utilized in the invention can be any of the standard carbonate precursors such as phosgene, diphenyl carbonate and the like. When using an interfacial process or a bischloroformate process it is also preferred to use a standard catalyst system well known in the synthesis of polycarbonates and copolyestercarbonates. A typical catalyst system is that of an amine system such as tertiaryamine, amidine or guanidine. Tertiaryamines are generally employed in such reactions. Trialkylamines such as triethylamine are generally preferred.

The monomer which supplies the ester units in the copolyestercarbonate is an aliphatic alpha omega dicarboxylic acid from 10 to about 20 carbon atoms preferably 10 to 12 carbon atoms. The aliphatic system is normal, branched or cyclic. Examples of the system include sebacic acid, dodecanedioic acid, C14, C18 and C20 diacids. The normal saturated aliphatic alpha omega dicarboxylic acids are preferred. Sebacic and dodecanedioic acid are most preferred. Mixtures of the diacids can also be employed. It should be noted that although referred to as diacids, any ester precursor can be employed such as acid halides, preferably acid, chloride, diaromatic ester of the diacid such as diphenyl, for example the diphenylester of sebacic acid. With reference to the carbon atom number earlier mentioned, this does not include any carbon atoms which may be included in the ester precursor portion, for example diphenyl.

The copolyestercarbonates of the invention can be prepared by the known methods, for example those appearing in Quinn U.S. Pat. Nos. 4,238,596 and Quinn and Markezich 4,238,597. Examples of such processes include the formation of acid halides prior to the reaction of the ester forming group with the dihydric phenol and then followed by phosgenation. Still further, the basic solution process of Goldberg in the U.S. Pat. No. 3,169,121 reference utilizing a pyridine solvent can also be employed while also using the dicarboxylic acid per se. A melt process utilizing the diesters of the alpha omega dicarboxylic acids can also be employed. An example of such a compound is the diphenylester of sebacic acid.

After substantial experimentation, it has been found that a preferred process for making the copolyestercarbonates of this invention exists. The process of Kochanowski, U.S. Pat. No. 4,286,083 (083) was initially utilized and then improved upon. It was found that lower diacids such as adipic acid were not incorporated into the polymer backbone to any great extent. Rather, one had to go up to higher carbon atom dicarboxylic acids before any significant incorporation of diacid into the backbone was observed. We have found that the dihydric phenol and alpha omega diacid should be phosgenated at a pH of at about 8 to 9 for about 70 to 95% of the phosgenation. Following that, the pH of the reaction should be raised to a level of about 10 to 12 preferably 10.2 to 11.2 for the remainder of the phosgenation. A preequilibration of the reactants, other than phosgene, at the initial reaction pH, 8 to 9, preferably 8 to 8.5, for a period of time, for example 3 to 10 minutes, seems to improve the incorporation of the diacid into the polymer. On a lab scale wherein the mixing is not as effective as in a resin reactor, dodecanedioic acid appears to incorporate better when it is used in fine particle size, for example about 50 to 300 mesh. In performing this interfacial reaction, the reactor should also contain a catalytic quantity of an amine, preferably triethylamine. Amine catalyst with a range of about 0.75 to about 3 mole percent based on the dihydric phenol content can be employed.

Further experimentation has shown that reaction time can be substantially reduced and the diacid totally or substantially incorporated within the copolyestercarbonate as well by utilizing in the interfacial reaction a solution of the dicarboylic acid salt. That is, a solution of the dicarboxylic acid salt is charged to the reactor rather than the dicarboxylic acid per se. Acids of 10 carbon atoms or greater are preferred. It is of course, preferred to prepare a solution of the same dicarboxylic acid salt as is being utilized as the aqueous medium in the interfacial reaction. For example when aqueous sodium hydroxide is used as the aqueous phase in the interfacial reaction as well as control the pH of the reaction, the sodium salt of the dicarboxylic acid is prepared. Other salts can be used such as prepared from potassium, calcium and the like. This is simply done by contacting the diacid, usually in its solid form, with aqueous sodium hydroxide and pumping that solution into the reactor. The dihydric phenol can be already present together with the aqueous base and endcapping agent. The carbonate precursor such as phosgene is added and the reaction allowed to proceed.

Interestingly with the use of the diacid salt solution the aforementioned pH periods are substantially changed. A period of time at a high pH, about 10 to 12, should still be used to obtain the desired product. However the quantity of time at the lower pH, 8 to 9 can be significantly reduced. For example when the entire reaction was run at pH, 10 with previously prepared sodium dodecanedioate for a period of only twenty minutes, 99 percent of the acid was incorporated into the copolyestercarbonate. When only 25% of the twenty minute reaction period was held at pH, 8, the remaining 15 minutes at pH, 10, and utilizing the previously prepared sodium dodecanedioate 100% of the acid was incorporated into the copolyestercarbonate. Therefore, anywhere from about 0 to about 95% of the carbonate precursor addition time should be run at about pH, 8 to 8.5 with the remainder of the carbonate precursor addition time being at a pH of about 10 to 12. Preferably the intitial period of carbonate precursor addition is from about 5 to 85%.

In order to control molecular weight, it is standard practice to utilize a chain stopping agent which is a monofunctional compound. This compound when reacting with the appropriate monomer provides a nonreactive end. Therefore the quantity of chain stopping compound controls the molecular weight of the polymer. Bulkier chain terminators than phenol should provide substantially better physical properties such as low temperature impact. Examples of these bulkier substituents include paratertiarybutylphenol, isononyl phenol, isooctyl phenol, cumyl phenols such as meta and paracumyl phenol, preferably paracumyl phenol, as well as chromanyl compounds such as Chroman I.

The copolyestercarbonate of this invention with the standard endcapping reagent posseses a substantially lowered glass transition temperature, Tg, therefore providing processability at a lower temperature. Surprisingly accompanying this lower temperature processability are substantially equivalent physical properties as a standard polycarbonate of the same intrinsic viscosity as the inventive composition and very high flow rates. When utilizing the bulklet endgroups, it is possible to achieve even lower molecular weight copolyestercarbonate while maintaining excellent physical properties such as aged impact resistance and/or low temperature impact resistance while having a very high flow rate. This allows the copolyestercarbonates of this invention to be utilized where the characteristics of polycarbonates such as clarity, impact resistance, modulus, and overall toughness are required but must also be present in increased processability through an enhanced flow rate. Such applications include optically pure materials such as audio discs, digital discs, other media storage devices, packaging materials, other thin walled parts and films, optical discs including fiber optics and the like.

The aliphatic alpha omega dicarboxylic acid ester is present in the copolyestercarbonate in quantities from about 2 to 30 mole percent, based on the dihydric phenol. Generally with quantities below about 2 mole percent the Tg is insufficiently lowered and significantly altered flow rate is not observed. Above about 30 mole percent, the physical properties of the copolyestercarbonate are significantly hindered in comparison to the polycarbonate without the aliphatic ester linkages. Preferred mole percents of aliphatic alpha omega dicarboxylic acid ester are from about 5 to 25 and more preferably about 7 to 15 mole percent of the dihydric phenol.

The weight average molecular weight of the copolyestercarbonate can generally vary from about 10,000 to about 100,000 as measured by GPC using a polystyrene standard, corrected for polycarbonate. A preferred molecular weight is from about 18,000 to about 40,000.

EXAMPLE 1

A. Preparation of Copolyestercarbonate with Sebacic Acid and Step Wise pH Process To a 100-liter, glass vessel was added deionized water (30 L), methylene chloride (35 L), bisphenol-A (BPA) (11.34 Kg, 49.68 mol), p-cumyl phenol (319 g, 1.50 mol), triethylamine (70 mL, 0.90 mol), sebacic acid 1005 g, 4.97 tool), and sodium gluconate (17.5 g). Phosgene was introduced to the reaction mixture at a rate of 150 g/min for 34 min (6600 g, 66.73 mol) while maintaining a pH range of 8.0–8.5. The pH was adjusted to 10.0 and the phosgenation continued for 10 min.

The phosgene free solution was diluted to 10% solids with the addition of methylene chloride (ca. 45 L) and the polymer solution was extracted until solution organic chloride levels were non-detectable and triethylamine content was less than 1 ppm.

The extracted polymer solution was isolated by steam precipitation at a 1.9 L/min feed rate and 100 psig stream feed pressure. The water wet, coarse powder was chopped in a Fitzmill to achieve a more uniform particle size and dried in a hot nitrogen fed fluid bed drier with the temperature at 110° C. maximum.

The copolyestercarbonate resin had a Tg of about 128° C. Standard polycarbonate has a Tg of 150° C. Extrusion at 230° C. and molding at 275° C. yielded a transparent material which exhibited improved flow and at 300° C. (g/10 rain) processability, MFI=15, as well as excellent mechanical properties. The ⅛" notched izod was 880 J/M, the DTUL measured at 1.8s MPa was 119° C.

B. Preparation of Copolyestercarbonate with the Earlier Prepared Salt of DDDA The disodium salt of dodecanedioic acid (DDDA) was generated by dissolving the free acid (7.2 g, 31 mmol) and NaOH pellets (2.7 g, 68 mmol) in water (180 mL).

A 2000 mL five neck Morton flask equipped with a bottom outlet was fitted with a mechanical stirrer, a pH probe, an aqueous sodium hydroxyde (50%) inlet tube, a Claisen adapter to which dry ice condenser was attached, and a gas inlet tube. The flask was charged with bisphenol A (71 g, 311 mmol), triethylamine (0.9 mL), p-cumylphenol (2.0 g, 9 mmol), methylene chloride (220 mL), and the disodium salt solution of DDDA described above. Then phosgene was introduced at a rate of 2 g/min, while the pH was maintained at 8 by addition of caustic for 10 minutes; the pH was then raised and maintained at around 10.5 while phosgene addition continued for 10 additional minutes. The total amount of phosgene added was 40 g (400 mmol). The pH was adjusted to 11–11.5 and the organic phase was separated from the brine layer and washed with 2% hydrochloric acid (3×300 mL), and with deionized water (5×300 mL).

The brine layer was acidified to pH 1 with concentrated HCl and no unreacted DDDA precipitated.

The solution was dried (MgSO$_4$), filtered, and then precipitated into methanol (1500 mL). The resin was washed with methanol (1×500 mL) and deionized water (4×500 mL), and dried at 100° C. for 15 hours.

EXAMPLES 2–6

To a 100-liter, glass vessel was added deionized water (30 L), methylene chloride (35 L), BPA (11.34 Kg, 49.68 mol), p-cumyl phenol (319 g, 1.50 mol), triethylamine (70 mL, 0.90 mol), dodecanedioic acid (1155 g, 4.97 mol), and sodium gluconate (17.5 g). Phosgene was introduced to the reaction mixture at a rate of 150 g/min for 34 min (6600 g, 66.73 mol) while maintaining a pH range of 8.0–8.5. The pH was adjusted to 10.0 and the phosgenation continued for 10 min.

The phosgene free solution was diluted to 10% solids with the addition of methylene chloride (ca. 45L) and the polymer solution was extracted until solution organic chloride levels were non-detectable and triethylamine content was less than 1 ppm.

The extracted polymer solution was isolated by steam precipitation at 1.9 L/min feed rate and 100 psig stream feed pressure. The water wet, coarse powder was chopped in a Fitzmill to achieve a more uniform particle size and dried in a hot nitrogen fed fluid bed drier with the temperature at 110° C. maximum.

The copolyestercarbonate resin had a Tg of about 125° C. Extrusion at 250° C. and molding at 275° C. yielded a transparent material which exhibited improved flow and processability, MFI=13 at 300° C. (g/10 min), compared to standard polycarbonate of similar or same molecular weight, as well as excellent mechanical properties. The ⅛" Notched Izod was 880 J/M, the DTUL measured at 1.82 MPa was 119° C.

Copolymers of various intrinsic viscosities containing 10 mol % dodecanedioyl ester were prepared according to this procedure. The copolyestercarbonates were paracumylphenol-endcapped. The copolyestercarbonates were compared to standard commercial grade BPA polycarbonates, Lexan 125, 145, and 135 prepared by GE Plastics, all of which were phenol end-capped, as well as stearic acid endcapped polycarbonate (SAPC) of a similar intrinsic viscosity. All materials were stabilized with 0.05 weight percent of a phosphite.

TABLE

| Example | 3 | 4 | 5 | 6 | SAPC | SAPC | 125 | 145 | 135 |
|---|---|---|---|---|---|---|---|---|---|
| IV (dl/g) | 0.51 | 0.48 | 0.53 | 0.62 | 0.48 | 0.53 | 0.48 | 0.52 | 0.63 |
| MFI (g/10 min) at 300° C. | 32 | 46 | 27 | 13 | 34 | 19 | 18 | 11 | 5 |
| Tg (C) | 124 | 124 | 123 | 127 | 126 | 131 | 149 | 149 | 150 |
| HDT (1.82 MPa) °C. | 116 | 117 | 118 | 119 | 116 | 123 | 138 | 140 | 142 |
| INI* (J/m) | 781 | 704 | 772 | 883 | 64(B) | 96(B) | 728 | 770 | 875 |
| Tens Y (N/mm) | 56.4 | 57.4 | 56.3 | 55.4 | 62.1 | 62.6 | 61.5 | 60.7 | 59.1 |
| % Elongation | 130 | 81 | 120 | 150 | 103 | 104 | 129 | 110 | 98 |

*Notched Izod

In general the copolyestercarbonates of the invention have substantially lower glass transition temperatures and heat deflection temperatures than the standard polycarbonates. In fact they were very similar to the stearic acid endcapped polycarbonate comparative examples. However these stearic acid endcapped materials were extremely embrittled in comparison to the normal polycarbonate and the copolyestercarbonates of the invention. The invention materials demonstrated outstanding flow relative to the standard polycarbonates while achieving equivalent impact resistance.

In the Table below, Example 4 of the invention is compared to a standard BPA polycarbonate but containing either 7 weight percent of a diphosphate plasticizer or in admixture with a 10 wt. % of polybutylene terephthalate.

| Example | IV | Tg | MFI (g/10 min) 300° C. | 125 NI (J/M) | Transmission |
|---|---|---|---|---|---|
| 4 | 0.48 | 124 | 46 | 883(D)* | 90 |
| 7% CR733S | 0.50 | 128 | 45 | 50(B)* | 90 |
| 10% PBT BLEND | 0.49 | 126 | 45 | 50(B)* | 89 |

*D is a ductile break, B is a brittle break

As is clearly observed from the above data, the presence of the plasticizer or the polyester brings about similar flows and transparancies but seriously embrittles the polycarbonate in comparison to the copolyestercarbonate of the invention.

EXAMPLES 7–9

Following procedures similar to Example 2, bisphenol-A copolyestercarbonates incorporating the same quantity of dodecanedioic acid and varying quantities of p-cumylphenol endcapper were prepared. The properties of these paracumyl-endcapped copolyester-carbonates were compared to a paracumylphenol endcapped bisphenol-A polycarbonate control. The results are provided below wherein there is 10 mole percent dodecane-dioic acid ester in the copolyestercarbonate, I.V. is intrinsic viscosity measured at 25° C. in methylene chloride, Mw is weight average molecular weight measured by GPC. MFI is Melt Flow Index at 300° C. (g/10 min). Y.I. is yellowness index measured according to ASTM D1925, and N.I. is notched izod impact strength measured according to ASTM D256 at room temperature (RT) and −10° C. All breaks were 100% ductile of all five samples except for control at −10° C. which was 100% brittle.

| Example | I.V. | Mw | MFI | Tg C | Y.I. | N.I. (J/M) RT | N.I. (J/M) −10° C. |
|---|---|---|---|---|---|---|---|
| Control | .439 | 22,000 | 22 | 149 | — | 623 | 156 |
| 7 | .495 | 27,766 | 16 | 130 | 1.9 | 831 | 779 |
| 8 | .488 | 26,363 | 25 | 125 | 1.7 | 831 | 779 |
| 9 | .456 | 21,717 | 48 | 125 | 1.9 | 623 | 675 |

As is observed from the above results, standard "high flow" paracumylphenol endcapped polycarbonate, the control, exhibited reasonable flow, MFI=22, at a molecular weight of about 22,000. However, the Notched Izod at −10° C. is low and completely brittle. The copolyestercarbonates of the invention, however, can have literally more than twice the flow, MFI=48 at almost the same molecular weight and are accompanied by high impact strength with complete ductility, even at the reduced temperature of −10° C.

The essence of the invention is the insertion of the aliphatic alpha omega dicarboxylate unit into the polycarbonate, thereby providing a copolyestercarbonate having repeating units of the structure

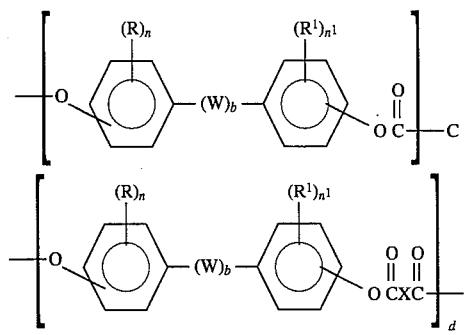

Figure 2 where R, R¹, n, n¹, W and b have been previously described and X is an aliphatic grouping of about 8 to about 18 carbon atoms, inclusive. The d repeating unit is present in the copolyestercarbonate in from about 2 to 30 mole percent of the total of the repeating units c+d, X is preferably about 10 to 18 carbon atoms, inclusive. The aliphatic system is preferably saturated and is normal, branched, cyclic or alkylene substituted cyclic. The mole percent of d is preferably about 5 to 25 and more preferably about 7 to 15 mole percent.

As shown in this specification, the copolyester carbonates of this invention essentially maintain a significant portion of the physical properties of polycarbonate of similar or same molecular weight but achieve these, except those related to Tg such as HDT, with reduced processing requirements since the Melt Flow Index for these new materials is substantially raised. Perhaps the most significant property maintained and in some cases even improved is the ⅛ inch Notched Izod impact strength. Similarly, copolyestercarbonates of this invention which have the same processability as standard polycarbonates can have significantly higher molecular weights and resulting property enhancements.

Thus, a further aspect of this invention is a method for using the above identified invention compositions. This is a method for processing resins which comprises processing a copolyestercarbonate of the above invention wherein the copolyestercarbonate is processed at a temperature significantly lower and with less work, as shown by a higher melt flow index than the same aromatic polycarbonate without ester units and of the same weight average molecular weight. Any type of processing operation is included for example, injection molding, rotary molding, blow molding, compression molding and extrusion processes such as sheet and film extrusion, profile extrusion, coextrusion and general compounding. Injection molding and extrusion are preferred.

When referring to the "polycarbonate of same or similar molecular weight" or "standard polycarbonate" reference is made to the polycarbonate made from the same dihydric phenol but without aliphatic ester repeat units.

Further examples of extruded articles of the copolyestercarbonate of the invention include ordinary sheet articles, as well as multi walled sheet and film. Generally the thickness of an extruded article which is of maximum thickness to be called "film" is about 0.5–1 min. The extruded articles need not be made of all copolyestercarbonate compositions of the invention. Rather such articles can be made from compositions comprising at least 90% by weight of the invention copolyestercarbonates. Other polymers may be present in the composition. Preferred examples of such polymers are polyesters such as the polyalkylene terephthalates, preferably polyethylene terephthalate and polybutylene terephthalate, as well as cyclohexanedimethanol (CHDM) containing polyesters.

Examples of such polyesters include polyesters prepared from CHDM and terephthalic acid, mixtures of terephthalic acid and isophthalic acid, mixture of CHDM and alkylene glycol, preferably ethylene glycol, wherein the CHDM is preferably from 20–80 mole % of the glycol present, the remainder being the alkylene glycol, preferably ethylene glycol. The acid portion of the CHDM containing polyesters is terephthalic, isophthalic, mixtures thereof or preferably terephthalic. Examples of such polyesters all available from Eastman Chemical are PCT (100% CHDM, terephthalic acid), PCTG (80% CHDM, 20% ethylene glycol, terephthalic acid) and PETG (80% ethylene glycol, 20% CHDM, terephthalic acid). Thermoformed products are readily prepared from the sheet or film.

Surprisingly these extruded film or sheet products show some unexpected advantages as compared to extruded products made out of conventional aromatic polycarbonates such as bisphenol-A polycarbonates.

Sheets extruded out of conventional aromatic polycarbonates require a predrying step before they can be thermoformed at elevated temperatures. If they are not predried, bubbling occurs at the surface of the thermoformed sheet.

It has been found that sheets extruded out of a thermoplastic composition based on the copolyestercarbonates of this invention do not require a predrying step before thermoforming.

It has further been found that sheets extruded out of a thermoplastic composition based on copolyestercarbonates of this invention are more resistant in the flame retardancy test according to DIN 4102, as compared to sheets extruded out of conventional aromatic polycarbonates. The test according to DIN 4102 is of importance for the building and construction industry.

Below are further examples of the invention. These examples are intended to further illustrate the invention.

Example 10

Two series of sheets (with a thickness of 3 millimeters) have been manufactured by extrusion on a Werner Pfleiderer twin screw extruder. One series (A) of sheets has been manufactured out of a conventional aromatic polycarbonate derived from bisphenol A and phosgene, with an intrinsic viscosity of 58 ml/g as measured in $CH_2 CL_2$ at 20° C. The second series (B) of sheets has been manufactured out of a copolyestercarbonate according to the invention, with a dodecanedioic $(HOOC[CH_2]_{10}COOH)$ content of 10 mole % based on dihydric phenol plus diacid with an intrinsic viscosity of 58.2 ml/g as measured in $CH_2 CL_2$ at 20° C.

The sheets were exposed to moisture and then thermoformed with a drying step prior to the thermoforming or no drying step. The thermoforming was done on a Geiss 1000×600 mm. vacuum forming machine with an aluminium mold, heated to 100° C. The sheets were heated by radiation prior to thermoforming. The radiation temperature is about 25° C. above the actual temperature of the sheet. The surface was examined after thermoforming.

The exact pretreatment, the radiation temperatures and the observed surface quality are recorded in following table.

TABLE

| Series | Pretreatment | Radiation temperature °C. | Observations |
|---|---|---|---|
| A | 14 days at relative humidities varying from 58–79%, no drying prior to thermoforming | 212 | Bubbling all over the formed part, diameter 1 to 1.5 mm, average 8 bubbles/cm². |
|   |   | 180 | Forming not possible. |
|   | Dried 24 hours 100 C | 212 | No bubbles |
| B | 14 days at relative humidities varying from 58–79%, no drying prior to thermoforming | 180 | At all 4 temperatures excellent formability and no bubbling visible |
|   |   | 185 |   |
|   |   | 190 |   |
|   |   | 195 |   |
|   |   | 212 | Some bubbling noticed. Diameter 0.5 mm, average 0.2 bubbles/cm2. |
|   | Stored 14 days at relative humidity 58–79%, then put under water during 24 hrs at 21° C., no drying prior to thermoforming | 180 | No bubbles, excellent forming. |
|   |   | 190 | Small bubbles 0.5 mm diam., 0.3 bubbles/cm² |
|   |   | 211 | Bubbles 1–1.5 mm, 0.3 bubbles/cm² |
|   | Dried 24 hours 100° C. | 211 | Excellent forming no bubbles. |

As can be seen from the results reported in the table, the sheet according to the invention can, even when not pre-dried, be formed without bubbles. Additionally it appears that such thermoforming can be carried out at a lower temperature than conventional polycarbonate.

EXAMPLE 11

Sheets with a dimension of 190×1000×3 (mm) were extruded from a polyestercarbonate according to the invention, with a dodecandioic acid content of 10 mole % with an intrinsic viscosity of 58.2 ml/g as measured $CH_2 CL_2$ at 20° C.

The sheets were arranged in the lay-out specified for the B1 fire test according to DIN 4102, part 1 Brandschacht= chimney-test and were tested in unaged condition.

During the burning test the sheet according to the invention did not show any gaseous development (bubbles) within the sheet, the specimen did not get ignited, there were no flaming drips and after the test the remaining length was 70 cm.

When sheet extruded out of conventional aromatic polycarbonate are subjected to the same test, some gaseous development (bubbles) in the sheet occurs, the specimen gets ignited and there are flaming drips. The remaining length is 40–60 cms.

Still further, a particularly preferred embodiment of the invention copolyestercarbonate that is the composition of the formula of FIG. 2 and claim 14 composition wherein there is less than about 0.5 mole %, based on moles of dihydric phenol and diacid in the polymer, of anhydride present in the composition. It has surprisingly been determined that unless the pH ranges are maintained above 10, preferably about 11 at the latter part of the phosgenation period for a sufficient length of time certain anhydride bonds will be formed and maintained in the polymer. Although most impurities particularly at the low level experienced here do not adversely affect polymeric stability, the anhydride bonds are extremely harmful to the thermal stability of the copolyestercarbonates of the invention.

The term "anhydride" means the diacid moiety of the polymer which has an anhydride linkage between it and a second acid moiety as illustrated below with dodecanedioic acid.

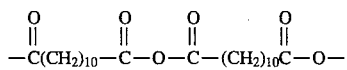

These anhydride bonds are formed during the polymerization reaction at the lower pH range. It requires the higher pH range to bring about a rearrangement of the polymer to remove the anhydride linkage and bring about a more purified copolyestercarbonate composition.

The copolyestercarbonate of the invention should have less than 0.5 mole percent anhydride bonds, preferably less than 0.3 and more preferably less than 0.1 mole percent anhydride bonds.

The anhydride bonds in the polymer can be detected by the use of high field $^1H$ NMR. Such NMR spectra were acquired using a 6 kHz sweep width, a 10s recycle delay, 30° C. flip angle, 16k memory size and 32 transients taken on a GE NMR Omega-300 NMR Spectrometer. The spectrum of a 10 mole % dodecanedioate bisphenol-A copolyestercarbonate prepared at the lower pH and an inadequate amount of time at the higher pH demonstrated anhydride bonds within the polymer. The ester triplet occurred at 2.53 ppm. The anhydride triplet occurred at 2.43 ppm.

In each case the triplet is due to the methylene protons immediately adjacent to the carbonyl in the dodecanedioic acid moiety as shown by the started methylene carbon atom below.

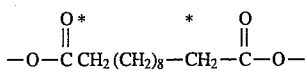

The presence of these anhydride bonds in the copolyestercarbonate polymer are extremely injurious to the thermal stability of the copolyestercarbonate of this invention. For example, $^1$H NMR spectra of powder and extruded pellets from the same lot of resin display different compositions. Under simple extrusion conditions, 230° C., the copolyestercarbonate undergoes thermal degradation that appears to result from the decomposition of the anhydride. Still further, the Table below shows the effect of anhydride bonds upon the melt viscosity as measured by Kasha Index, KI, upon a series of 10 mole percent dodecanedioate containing bisphenol-A copolyestercarbonates with and without the measurable presence of anhydride bonds.

KI is measured in the following manner: 7 grams of resin pellets, dried a minimum of 90 minutes at 125° C., are added to a modified Tinius-Olsen model T3 melt indexer; the temperature in the indexer is maintained at 300° C. and the resin is heated at this temperature for 6 minutes; after 6 minutes the resin is forced through a 1.048 mm radius orifice using a plunger of radius of 4.737 mm and an applied force of 8.03 kgf; the time required for the plunger to travel 50.8 mm is measured in centiseconds and this is reported as the KI.

| Copolyestercarbonate Sample | MW | Tg °C. | Anhydride Bond Present | KI 6 Minute Centisecond |
|---|---|---|---|---|
| A | 27,400 | 126 | Yes | 310 |
| B | 24,700 | 127 | No | 1100 |
| C | 30,000 | 127 | Yes | 400 |
| D | 28,000 | 127 | No | 1700 |
| E | 32,300 | 127 | Yes | 500 |
| F | 31,000 | 127 | No | 3000 |

As is readily apparent from the data, the presence of the anhydride brings about substantial degradation of the polymer under the experimental conditions.

The optimum methods of preparation which minimize the presence of the anhydride bonds, usually below the higher field $^1$H NMR detection limit of 0.1 mole %, is the following.

The present optimum procedure for preparing copolyestercarbonates of the invention minimize the anhydride present in the polymer and maximizes the quantity of diacid incorporated into the polymer. A partial incorporation of the diacid not only affects the product consistency but the unreacted diacid remains in the aqueous phase at the end of the reaction as the salt and can pose problems in the later treatment of that phase. Therefore the polymerization must be carried out in a certain pH range and certain time to allow the incorporation into the polymer of the diacid but the pH must then be raised to a certain level and for a sufficient length of time during the latter stages of the polymerization to enable the anhydrides to be altered to ester bonds, thereby providing the invention copolyestercarbonate which is essentially anhydride free.

Generally with the passages of 1.2 equivalents of phosgene per mole of dihydric phenol and diacid, the pH of the phosgenation should be maintained at about 8 for about 50–85% of the phosgenation time period and then raised to about 11 over about a thirty second time period (small batch) for the remainder of the time period, about 15–50 percent of the time. The optimum time for increasing the pH appears to be at about 70% of the phosgenation time period.

Of course, it is desirable to maximize the phosgenation rate so as to bring about a minimum reaction time which utilizes equipment most productively. The phosgenation rate can be increased substantially by introducing to the reactor, a pre made solution of the salt of the diacid, preferably the sodium salt, as opposed to the diacid itself. For example when using reaction time of 26 minutes, 18 at pH 8, 8 at pH 11 to prepare a 10 mole % dodecanedioate bisphenol-A copolyestercarbonate in a maxilab facility, a copolyestercarbonate with non detectable level of anhydride was formed leaving 74 ppm free diacid in the aqueous phase when introducing into the reactor a solution of the disodio salt of dodecanedioic acid.

Experimentation in preparing the solution of the preferred disodio salt of the dodecanedioic acid (DDDA) indicate that smaller DDDA particle size, lower percent solids and a slight excess of sodium hydroxide all contribute to reduced dissolution times. Coarse, flaked DDDA takes more than twice as long to dissolve than the granular material prepared by pulverization in a stainless steel Waring Blender. Below are the results.

TABLE

| Diacid Used | Particle Size | % Solids (wt/wt) | NaOH/DDDA Mole ratio | Dissolution Time (min) | Comments |
|---|---|---|---|---|---|
| DDDA | Granular[b] | 13.3 | 2.5 | >180 | Slurry emulsion |
| DDDA | Granular[b] | 7.0 | 2.5 | 7 | Clear solution |
| DDDA | Flaked[c] | 7.0 | 2.5 | 16 | Clear solution |
| DDDA | Flaked[c] | 7.0 | 5.0 | >180 | Slurry emulsion |
| Azelaic[a] | Flaked[d] | 7.0 | 2.5 | 17 | Clear solution |

[a]Emerox 1144
[b]20–40 mesh
[c]Flakes as large as ¼ inch in diameter
[d]Flakes as large as ½ inch in diameter The solution addition of salt of diacid was verified in larger quantity preparation of 9 mole % dodecanedioate bisphenol-A copolyestercarbonate. Adding about 111 pounds of phosgene in each reaction, the rate of phosgenation was increased so as to bring down the reaction time. In each case the pH was held at 8 to 8.5 until 60 pounds of phosgene had been transferred to the reactor. The pH was then ramped to 10.5–11 over the next five minutes and held for the remainder of the reaction time. High field NMR did not detect any anhydride in the samples. The incorporation of the DDDA was not seriously effected by the phosgenation rates. In the Table below pounds per hour is expressed as pph.

TABLE

| Phosgene Rate (pph) | pH Ramp Start (lbs Phosgene) | pH Ramp end (Lbs Phosgene) (% reaction) | Unreacted DDDA in aqueous phase ppm |
|---|---|---|---|
| 190 | 60 | 77.5 (70) | 47 |
| 220 | 60 | 77.7 (71) | 27 |
| 260 | 60 | 86.1 (78) | 5 |
| 330 | 60 | 92.0 (84) | NA |

Articles molded or extruded from this copolyestercarbonate of the invention having less than 0.5 mole percent anhydride have enhanced thermal stability. Examples of such copolyestercarbonate articles are well known. These copolyestercarbonates may also have $C_8$ diacid (suberic) or $C_9$ diacid (azelaic) present in the copolyestercarbonate, as the sole ester unit that is, the lower limit of the carbon number of the diacid incorporated is extended from $C_{10}$ to $C_8$ with the other variables remaining the same. In FIG. 2, therefore, X would have a lower limit of 6 carbon Polymers of the invention with less than about 500 ppm free diacid in the aqueous phase are readily prepared.

What is claimed is:

1. A multi-walled article wherein at least one wall of said article is comprised of a sheet of a copolyestercarbonate derived from a dihydric phenol; a carbonate precursor; and an aliphatic alpha omega dicarboxylic acid or ester precursor wherein the dicarboxylic acid or ester precursor has from 10 to about 20 carbon atoms, inclusive, and is chemically condensed in the copolyestercarbonate in quantities of from about 2 to 30 mole percent of the dihydric phenol.

2. The multi-walled article of claim 1, wherein the dicarboxylic acid or ester precursor has from 10 to about 14 carbon atoms, inclusive.

3. The multi-walled article of claim 1, wherein the mole percent is from about 8 to 15 mole percent.

4. The multi-walled article of claim 2, wherein the mole percent is from about 8 to 15 mole percent.

5. A multi-walled article wherein at least one wall of said article is comprised of a sheet of a copolyestercarbonate derived from a dihydric phenol, a carbonate precursor, and from about 2 to 30 mole percent of the dihydric phenol of an aliphatic alpha omega dicarboxylic acid or ester precursor wherein the dicarboxylic acid or ester precursor has from 8 to about 20 carbon atoms, inclusive, wherein the copolyestercarbonate is endcapped with a monophenolic compound which provides the copolyestercarbonate with better notched izod impact resistance and ductility after aging than a phenol endcapped copolyestercarbonate.

6. The multi-walled article of claim 5, wherein the dicarboxylic acid or ester precursor has from 8 to about 14 carbon atoms, inclusive.

7. The multi-walled article of claim 5, wherein the mole percent is from about 8 to 15 mole percent.

8. The multi-walled article of claim 5, wherein the copolyestercarbonate is endcapped with a compound selected from the group consisting of isooctylphenol, isononylphenol, cumylphenol or a chromanyl compound.

9. The multi-walled article of claim 8, wherein the compound is paracumylphenol.

10. The multi-walled article of claim 5, wherein the diacid is azelaic.

11. A method for processing polycarbonate resin which comprises extruding as a sheet a copolyestercarbonate having repeat units of the structure

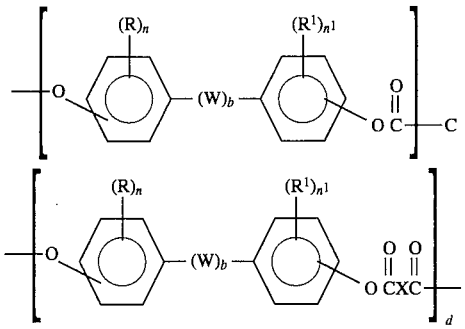

wherein:

R is independently selected from halogen, monovalent hydrocarbon, and monovalent hydrocarbonoxy radicals;

$R^1$ is independently selected from halogen, monovalent hydrocarbon, and monovalent hydrocarbonoxy radicals;

W is selected from divalent hydrocarbon radicals,

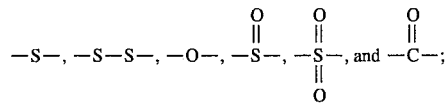

n and $n^1$ are independently selected from integers having a value of from 0 to 4 inclusive;

b is either zero or one;

X is an aliphatic group of about 6 to 18 carbon atoms, inclusive;

c is from about 2 to 30 mole percent of the total units c+d; and with less work than required for a polycarbonate resin which does not have repeat units of the above formulae and which has the same or similar molecular weight.

12. The multi-walled article of claim 1, wherein said article comprises media storage devices or packaging materials.

13. The multi-walled article of claim 12, wherein said media storage device is selected from the group consisting of audio devises and digital devises.

14. The multi-walled article of claim 1, wherein said article comprises at least 90% by weight of the copolyestercarbonate.

15. The multi-walled article of claim 1, wherein said article comprises a second polymeric material.

16. The multi-walled article of claim 15, wherein said additional polymeric material comprises a polyester.

17. The multi-walled article of claim 16, wherein said polyester comprises polyethylene terephthalate, polybutylene terephthalate or cyclohexanedimethanol containing polyesters.

* * * * *